(12) United States Patent
Chen (10) Patent No.: US 12,318,847 B2
(45) Date of Patent: Jun. 3, 2025

(54) CUTTER HOLDER ASSEMBLY CAPABLE OF REDUCING LONGITUDINAL ASSEMBLING GAP BETWEEN CUTTER AND COLLET

(71) Applicant: SHIN-YAIN INDUSTRIAL CO., LTD., Taichung (TW)

(72) Inventor: Pen Hung Chen, Taichung (TW)

(73) Assignee: SHIN-YAIN INDUSTRIAL CO., LTD., Taichung (TW)

( * ) Notice: Subject to any disclaimer, the term of this patent is extended or adjusted under 35 U.S.C. 154(b) by 188 days.

(21) Appl. No.: 18/452,122

(22) Filed: Aug. 18, 2023

(65) Prior Publication Data
US 2025/0058381 A1 Feb. 20, 2025

(51) Int. Cl.
*B23B 31/113* (2006.01)
*B23B 31/20* (2006.01)

(52) U.S. Cl.
CPC ............ *B23B 31/113* (2013.01); *B23B 31/20* (2013.01); *B23B 31/208* (2013.01); *B23B 2231/2005* (2013.01); *B23B 2260/10* (2013.01); *Y10T 279/17888* (2015.01); *Y10T 279/3487* (2015.01)

(58) Field of Classification Search
CPC ..... B23B 31/113; B23B 31/20; B23B 31/208; B23B 2231/2005; B23B 2260/10; Y10T 279/17316; Y10T 279/17418; Y10T 279/3487; Y10T 279/17888
USPC .......................... 279/9.1, 43.1, 46.2, 93, 156
See application file for complete search history.

(56) References Cited

U.S. PATENT DOCUMENTS

| | | | | |
|---|---|---|---|---|
| 2,429,564 A * | 10/1947 | Petersen | ................ | B23B 31/08 408/142 |
| 3,719,367 A * | 3/1973 | Baturka | ................ | B23B 31/208 82/155 |
| 5,957,467 A * | 9/1999 | Hornung | ............... | B23B 31/208 279/54 |
| 2003/0150079 A1* | 8/2003 | Takai | .................... | F16C 29/046 16/26 |
| 2015/0321264 A1* | 11/2015 | Suruga | .................. | B23B 31/117 279/93 |

(Continued)

FOREIGN PATENT DOCUMENTS

| | | | | |
|---|---|---|---|---|
| CH | | 693168 A5 * | 3/2003 | ........... B23B 31/201 |
| DE | 102018133474 A1 * | | 6/2020 | |
| DE | 202021105392 U1 * | | 11/2021 | |

(Continued)

*Primary Examiner* — Sunil K Singh
*Assistant Examiner* — Michael Vitale
(74) *Attorney, Agent, or Firm* — RABIN & BERDO, P.C.

(57) ABSTRACT

A cutter holder assembly has a cutter holder, a collet disposed in the cutter holder and having a positioning groove and a mounting cavity, a cutter set mounted in the collet, and a resilience tightening set mounted in the mounting cavity of the collet. The cutter set includes a cutter body and a positioning protrusion engaged with a limiting groove of the positioning groove. The resilience tightening set includes a spring room, a spring disposed in the spring room, and a position ball movably disposed in and partially extending out of the spring room. The position ball is pushed by the spring to push the cutter set to keep the positioning protrusion tightly abutting against a surface of the limiting groove, thereby reducing a longitudinal assembling gap between the cutter set and collet.

6 Claims, 10 Drawing Sheets

(56) References Cited

U.S. PATENT DOCUMENTS

2021/0008642 A1\* 1/2021 Chen ................. B23B 31/208
2022/0212273 A1\* 7/2022 Chen ................. B23B 51/12

FOREIGN PATENT DOCUMENTS

| | | | | | |
|---|---|---|---|---|---|
| GB | 2170125 | A | \* 7/1986 | ........... | B23B 31/113 |
| JP | H068006 | U | \* 2/1994 | | |
| JP | 2002240924 | A | \* 8/2002 | | |
| WO | WO-2014103031 | A1 | \* 7/2014 | ........... | B23B 31/005 |

\* cited by examiner

CUTTER HOLDER ASSEMBLY CAPABLE OF REDUCING LONGITUDINAL ASSEMBLING GAP BETWEEN CUTTER AND COLLET

BACKGROUND OF THE INVENTION

1. Field of the Invention

The present invention relates to a cutter holder assembly for a machining tool, and more particularly to a cutter holder assembly capable of reducing a longitudinal assembling gap between a cutter and a collet.

2. Description of the Prior Art

A conventional cutter holder assembly substantially comprises a cutter holder, a collet, a cutter, and a position key. The collet extends into the cutter holder and has a positioning groove. The cutter extends into the collet. The position key is disposed to the cutter and has a positioning protrusion engaged with the positioning groove. Therefore, the cutter is kept from falling out of the collet.

To ensure that the position key is smoothly inserted into the positioning groove of the collet, a size of the positioning groove is slightly larger than the positioning protrusion of the position key. A gap is formed between the positioning protrusion and the positioning groove, thereby reducing the assembly accuracy of the conventional cutter holder assembly. The cutter is prone to shaking during rapid spinning.

To overcome the shortcomings, the present invention provides a cutter holder assembly to mitigate or obviate the aforementioned problems.

SUMMARY OF THE INVENTION

The main objective of the present invention is to provide a cutter holder assembly capable of reducing a longitudinal assembling gap between a cutter and a collet of the cutter holder assembly.

A cutter holder assembly comprises a cutter holder, a collet, a cutter set, and a resilience tightening set. The collet is disposed in the cutter holder and includes a first end, a second end, a chamber formed in the collet and extending from the first end toward the second end of the collet, a positioning groove recessed in an internal peripheral surface of the chamber, and a mounting cavity formed in the second end of the collet and communicating with the chamber. The positioning groove has a guiding channel extending from the first end toward the second end of the collet and a limiting groove circumferentially extending along the internal peripheral surface of the chamber, communicating with the guiding channel, and spaced apart from the first end and the second end of the collet. The cutter set is mounted in the collet and includes a cutter body inserted into the chamber of the collet and a positioning protrusion protruding from an external peripheral surface of the cutter body, extending into the positioning groove, and engaged with the limiting groove. The resilience tightening set is mounted in the mounting cavity of the collet and includes a spring room having an opening facing toward the cutter set, a spring disposed in the spring room, and a position ball movably disposed in the spring room, partially protruding out of the opening of the spring room, and pushed by the spring for pushing the cutter body toward the first end of the collet to keep the positioning protrusion tightly abutting against a surface of the limiting groove of the positioning groove adjacent to the first end of the collet.

Other objectives, advantages and novel features of the invention will become more apparent from the following detailed description when taken in conjunction with the accompanying drawings.

DETAILED DESCRIPTION OF THE PREFERRED EMBODIMENTS

With reference to FIGS. 1 to 4 and 7, a cutter holder assembly in accordance with the present invention comprises a cutter holder 10, a collet 20, a cutter set 30, a resilience tightening set 40, and a tightening collar 50. With reference to FIGS. 2 to 6, the collet 20 is disposed in the cutter holder 10 and includes a first end 201, a second end 202, a chamber 22, a positioning groove 24 and a mounting cavity 26.

The chamber 22 is formed in the collet 20 and extends from the first end 201 toward the second end 202. The positioning groove 24 is recessed in an internal peripheral surface of the chamber 22 and has a guiding channel 242 and a limiting groove 244. The guiding channel 242 is recessed in the internal peripheral surface of the chamber 22 and extends from the first end 201 toward the second end 202, and is spaced apart from the second end 202. The limiting groove 244 circumferentially extends along the internal peripheral surface of the chamber 22 and communicates with the guiding channel 242. An angle is formed between the guiding channel 242 and an end of the limiting groove 244 away from the guiding channel 242. The limiting groove 244 may extend from an end of the guiding channel 242 away from the first end 201 of the collet 20 and is spaced apart from the first and second ends 201, 202 of the collet 20. The mounting cavity 26 is formed in the second end 202 of the collet 20, communicates with the chamber 22, and has a connecting channel 262 being adjacent to the second end 202 of the collet 20 and has an internal thread spirally formed around the internal peripheral surface of the connecting channel 262.

With reference to FIGS. 2, 4 to 8, the cutter set 30 is mounted in the collet 20 and includes a cutter body 31 and a positioning protrusion 333. The cutter body 31 is inserted into the chamber 22. The positioning protrusion 333 protrudes from an external peripheral surface of the cutter body 31, extends into the positioning groove 24, and is engaged with the limiting groove 244. Preferably, the cutter body 31 has a key seat 312 recessed in the external peripheral surface thereof. The cutter set 30 comprises a position key 33 detachably disposed on the key seat 312 of the cutter body 31. The positioning protrusion 333 is formed at a side of the position key 33 away from the cutter body 31. Preferably, the position key 33 is magnetically attached to the cutter body 31 and has a magnetic attracting portion 332. The magnetic attracting portion 332 has at least one magnet embedded in the position key 33 for generating magnetic force to attach the position key 33 magnetically to the cutter body 31. The position key 33 is prevented from separating from the cutter body 31.

With reference to FIGS. 2, 4 to 6, and 9, the resilience tightening set 40 is mounted in the mounting cavity 26 of the collet 20 and includes a mounting base 41, a spring room 42, a spring 44, and a position ball 43. The mounting base 41 is connected to the mounting cavity 26 via a threaded engagement. The mounting base 41 has a flange 413 being adjacent to an end of the mounting base 41 facing away from the cutter body 31 and an external thread spirally formed around the flange 413 for the threaded engagement with the connecting channel 262 of the mounting cavity 26. The spring room 42 is formed in the mounting base 41 and has an opening facing toward the cutter set 30. The spring 44 is disposed in the spring room 42. The position ball 43 is movably disposed in the spring room 42, partially protrudes out of the opening of the spring room 42, and is pushed toward the cutter set 30 via the spring 44. When the position ball 43 is pressed by an external force, the position ball 43 retracts into the spring room 42 and compresses the spring 44.

Figure 1:
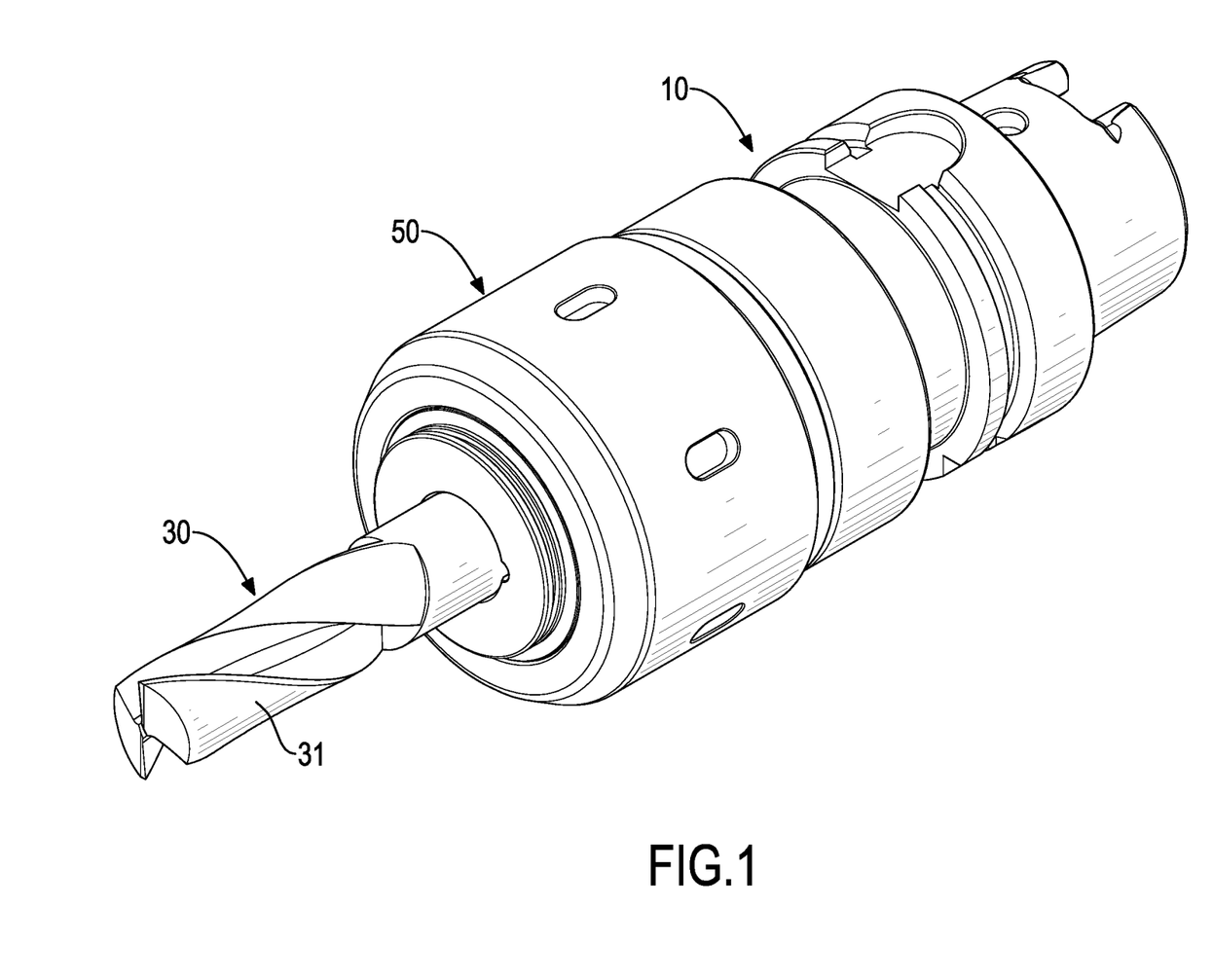
FIG. 1 is a perspective view of a cutter holder assembly in accordance with the present invention.
Figure 2:
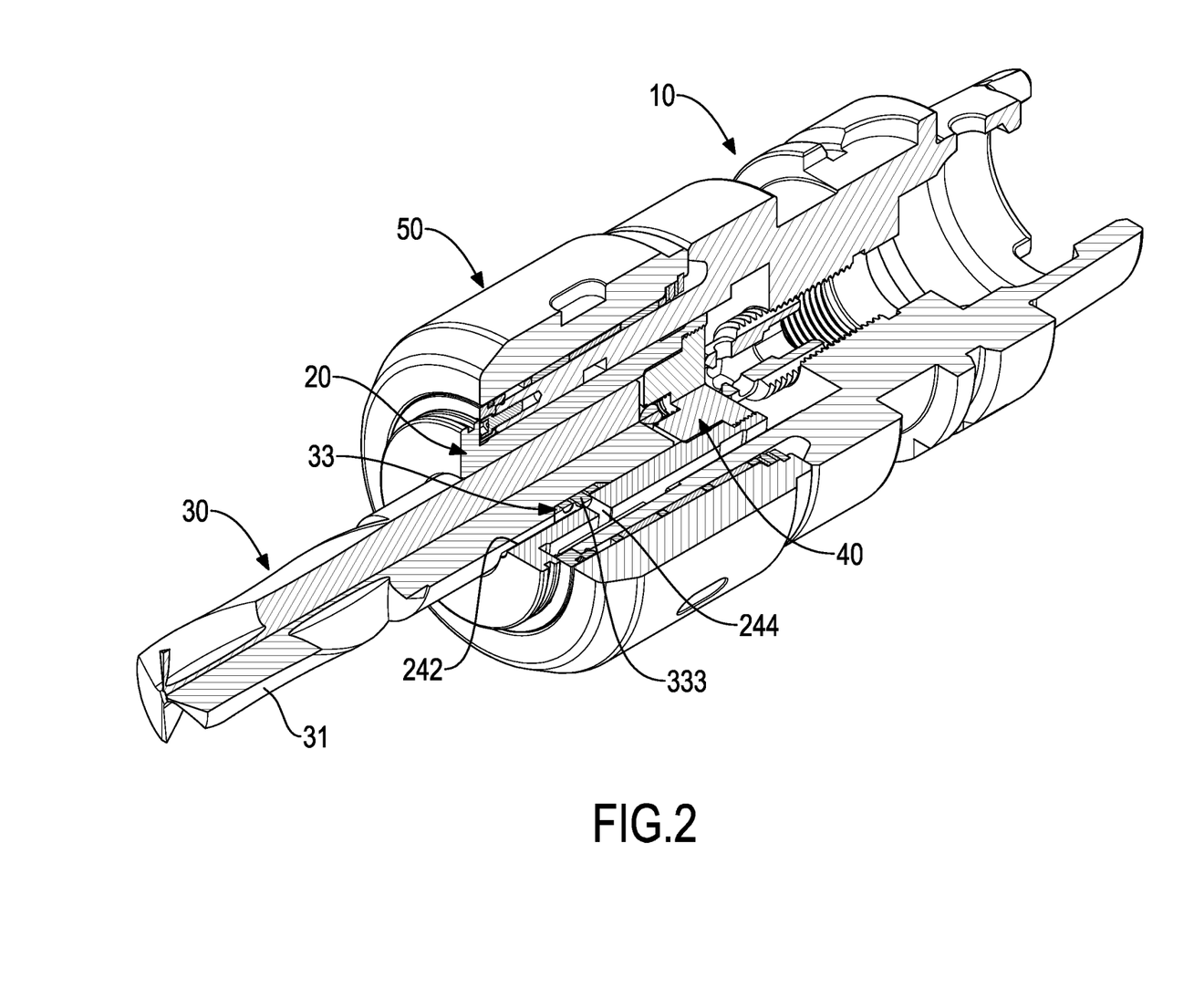
FIG. 2 is a perspective view in partial section of the cutter holder assembly in FIG. 1.
Figure 3:
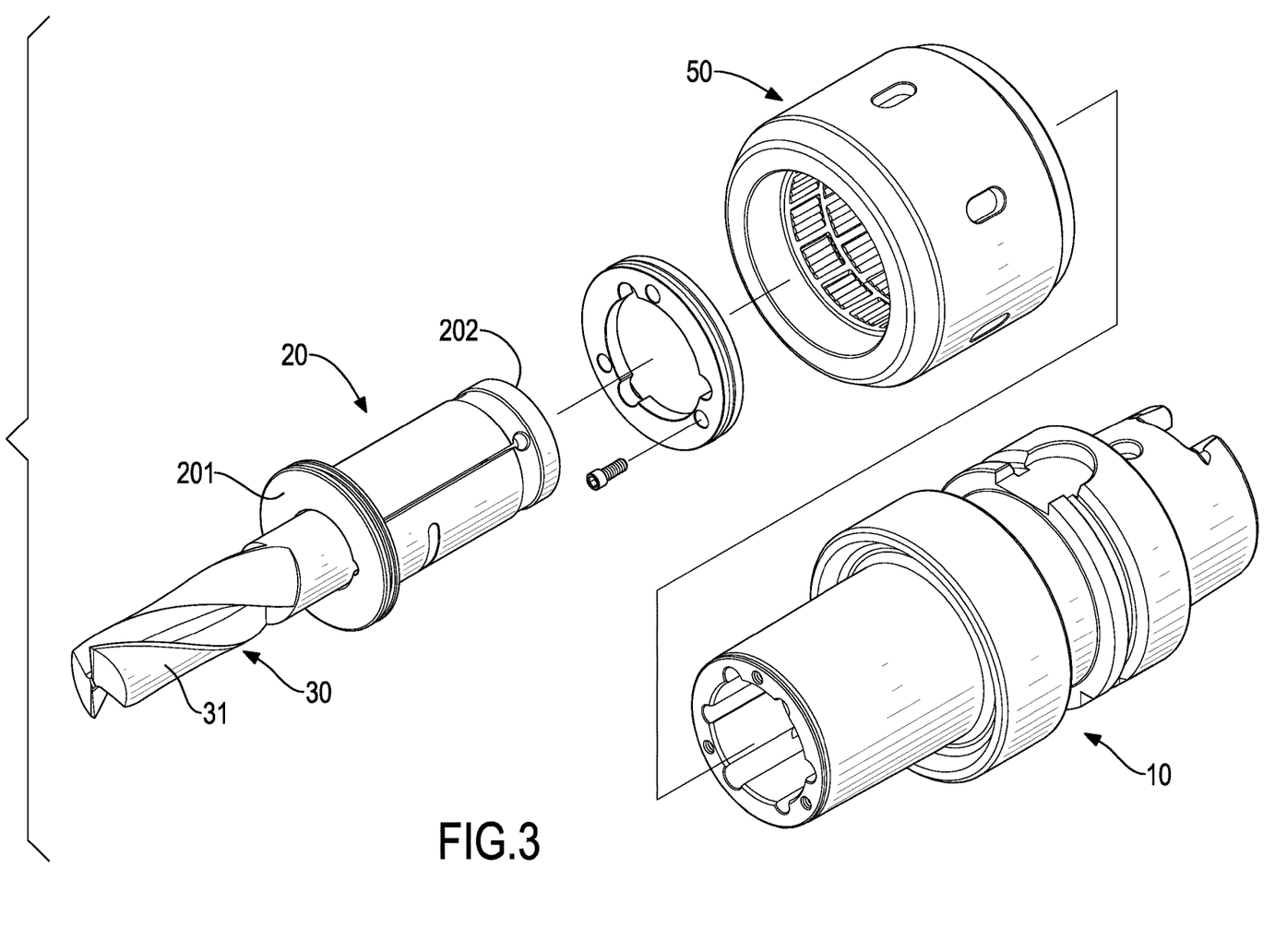
FIG. 3 is an exploded perspective view of the cutter holder assembly in FIG. 1.
Figure 4:
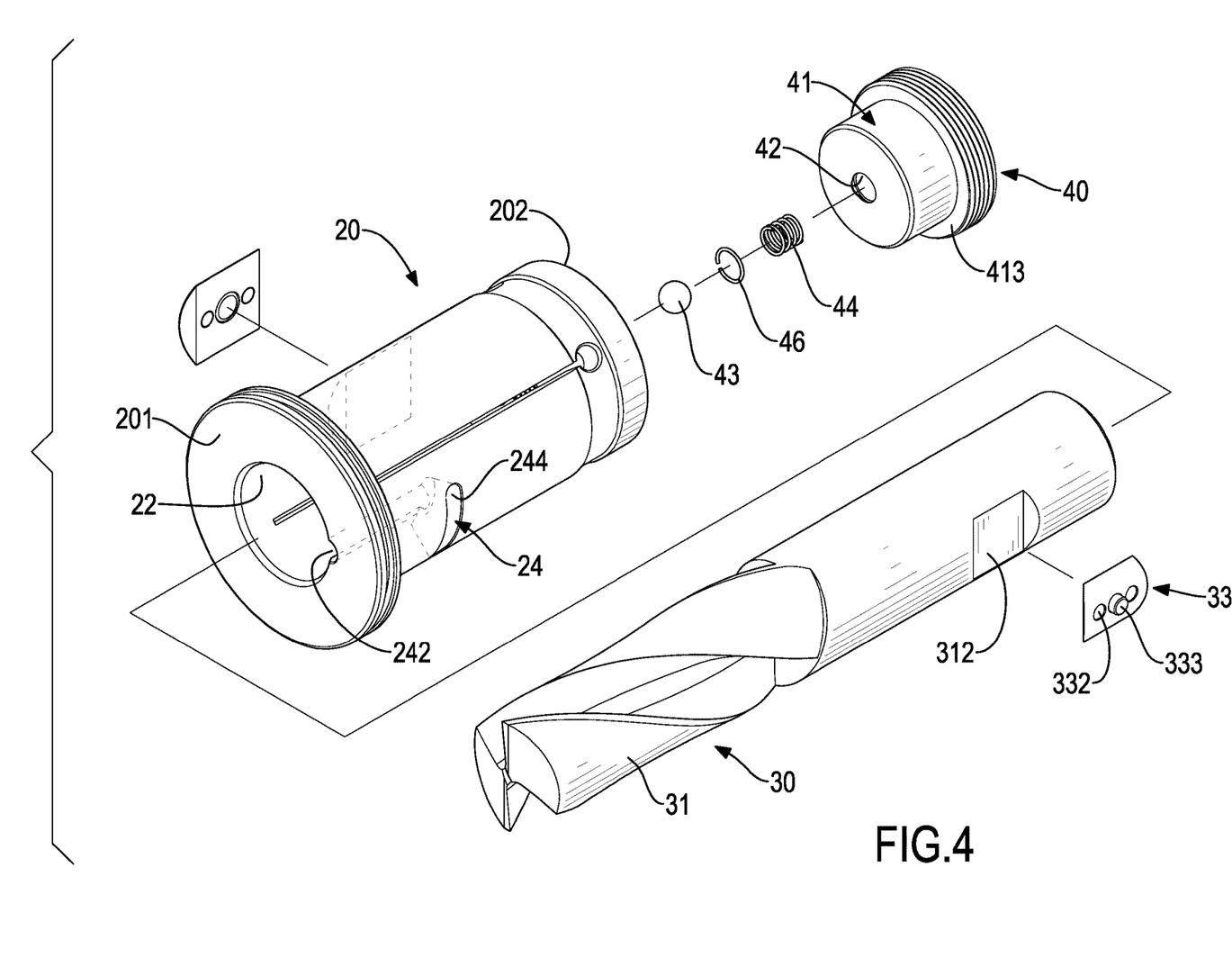
FIG. 4 is an enlarged exploded perspective view of the cutter holder assembly in FIG. 3.
Figure 5:
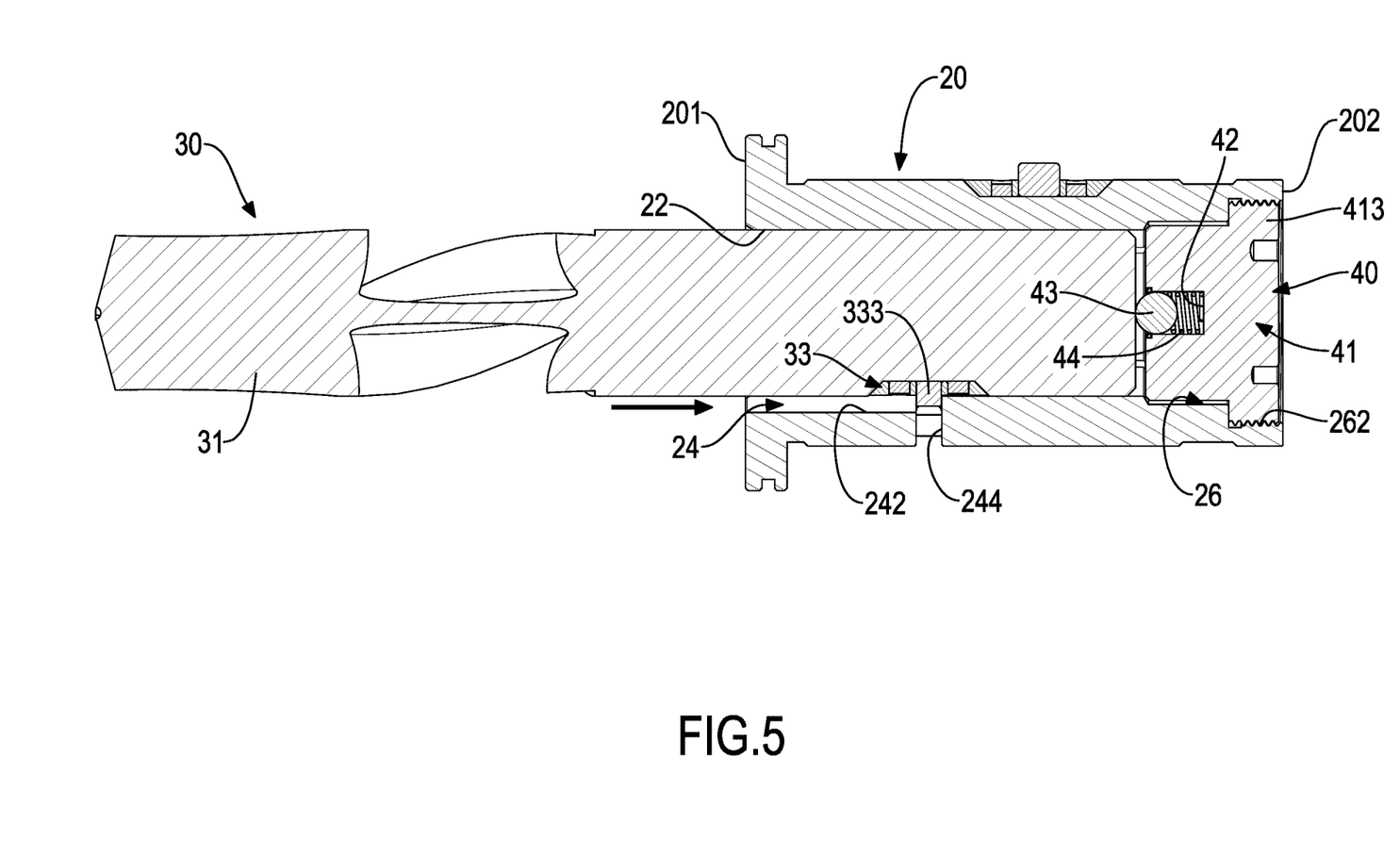
FIG. 5 is an operational cross sectional side view in partial section of the cutter holder assembly in FIG. 1 and shows that a cutter is inserted into a collet along a guiding channel of a positioning groove of the collet.
Figure 6:
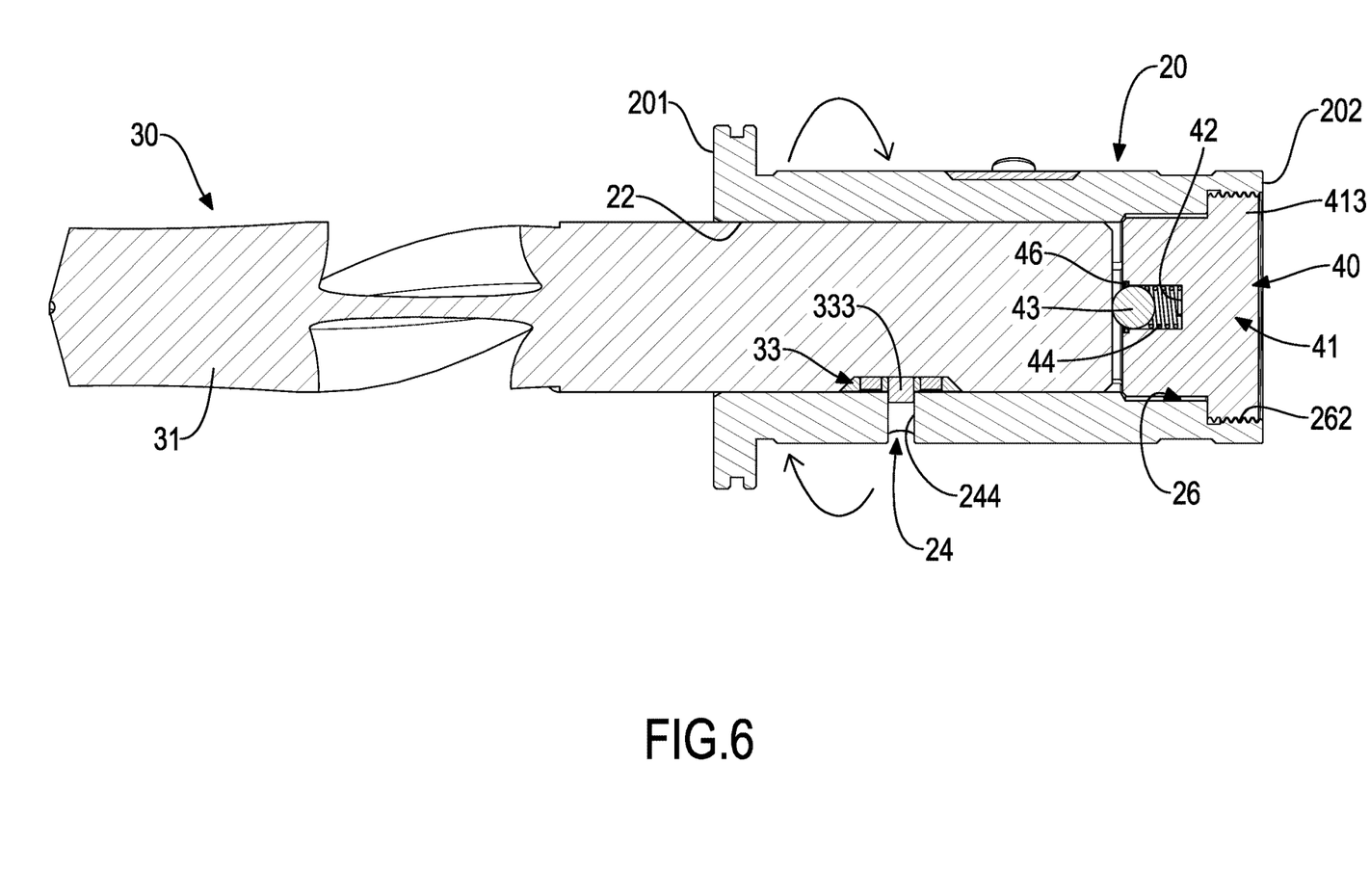
FIG. 6 is an operational cross sectional side view in partial section of the cutter holder assembly in FIG. 1 and shows that the cutter is rotated relative to the collet for engaging with a limiting groove of the positioning groove of the collet.
Figure 7:
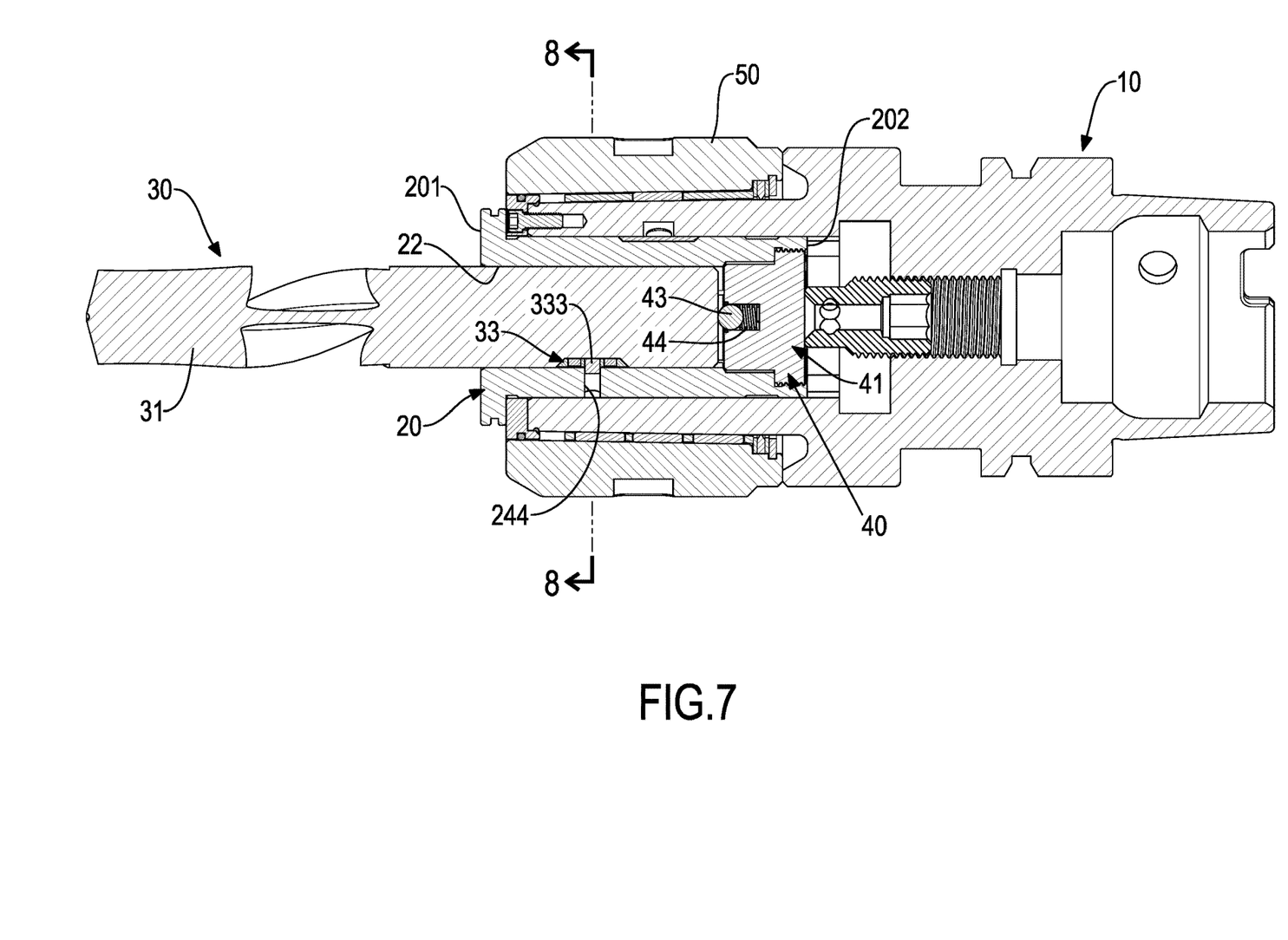
FIG. 7 is a cross sectional side view of the cutter holder assembly in FIG. 1.
Figure 8:
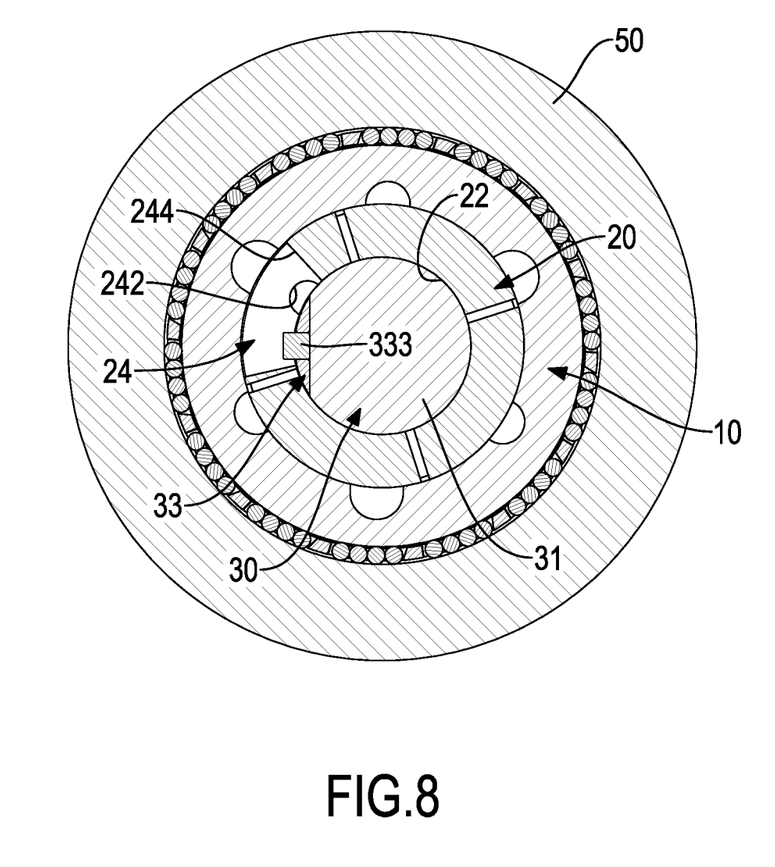
FIG. 8 is a cross sectional end view of the cutter holder assembly along line 8-8 in FIG. 7.

With reference to FIGS. 1, 2, and 7, the tightening collar 50 is sleeved on and surrounds an external periphery of the cutter holder 10 to compress the cutter holder 10 for tightly clamping the collet 20.

Figure 9:
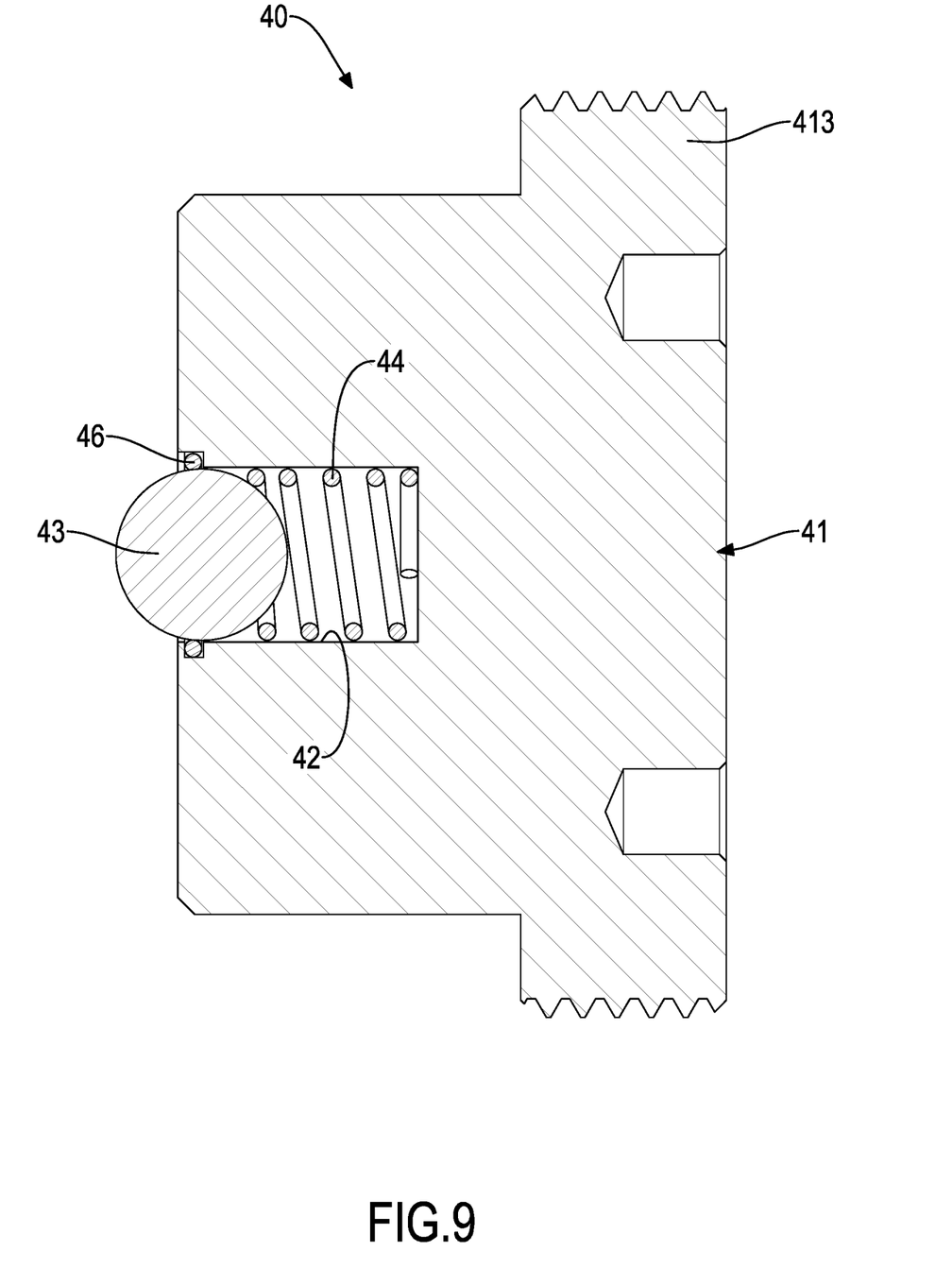
FIG. 9 is a cross sectional side view of a resilience tightening set of the cutter holder assembly in FIG. 4.

With reference to FIG. 9, the resilience tightening set 40 further includes a snap ring 46 engaged with the spring room 42, being adjacent to and spaced apart from the opening of the spring room 42. An inner diameter of the snap ring 46 is smaller than a ball diameter of the position ball 43 to keep the position ball 43 from dropping out of the spring room 42.

Figure 10:
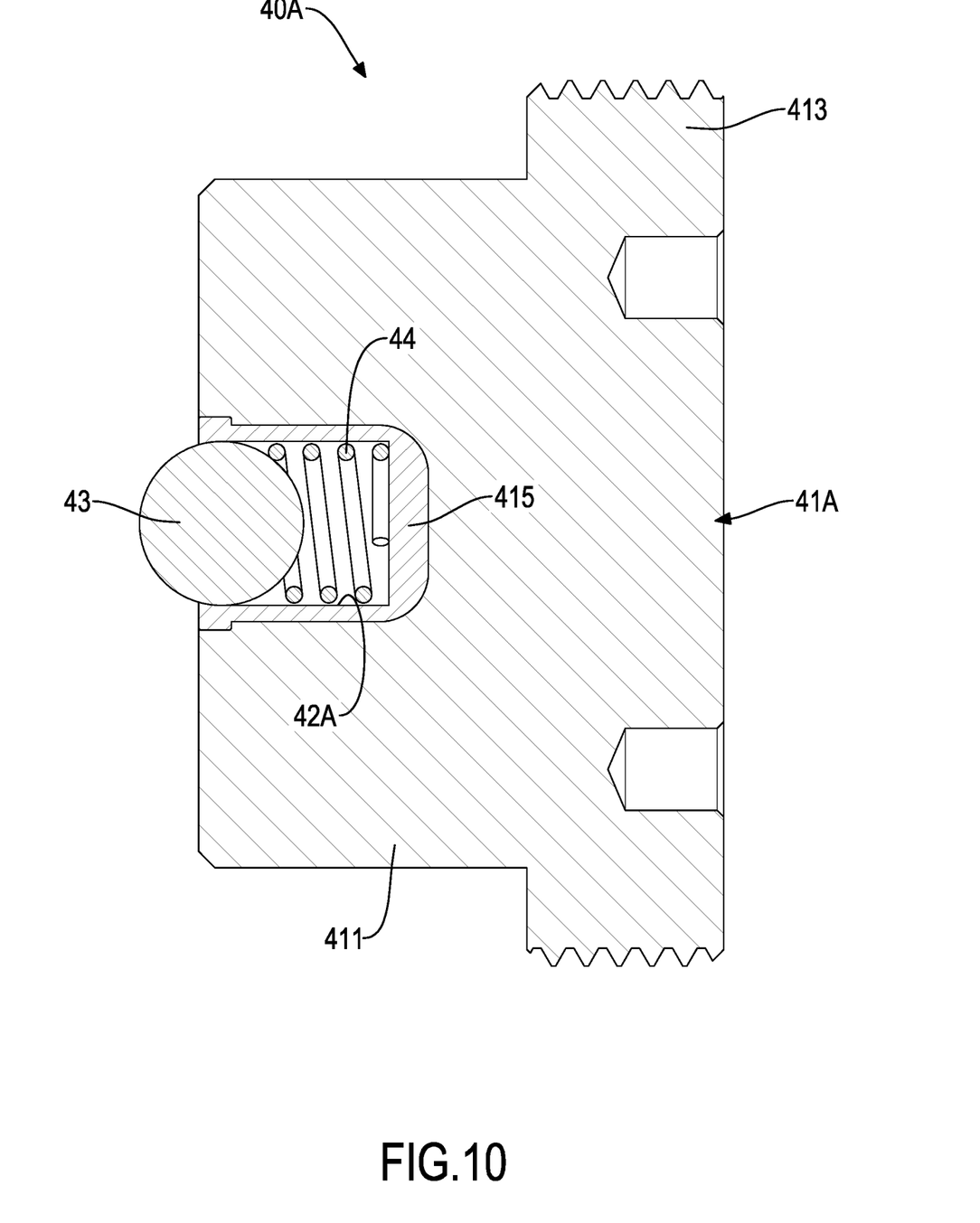
FIG. 10 is a cross sectional side view of another embodiment of a resilience tightening set of a cutter holder assembly in accordance with present invention.

With reference to FIG. 10, in another embodiment, a diameter of the opening of the spring room 42 of the resilience tightening set 40A is smaller than the ball diameter of the position ball 43 to keep the position ball 43 from dropping out of the spring room 42A. The mounting base 41A may include a base body 411 and a spring holder 415 disposed in the base body 411. The spring room 42A is formed in the spring holder 415.

With reference to FIGS. 5 to 8, to mount the cutter set 30 in the collet 20, the positioning protrusion 333 is aligned with and is inserted into an opening of the guiding channel 242, and then the cutter set 30 is inserted into the chamber 22 along the guiding channel 242. When the positioning protrusion 333 abuts against the end of the guiding channel 242 away from the first end 201 of the collet 20, the cutter set 30 is rotated to turn the positioning protrusion 333 to engage with the limiting groove 244. Accordingly, the cutter set 30 is located at an installation position and is kept from dropping out of the collet 20.

When an end of the cutter body 31 facing to the resilience tightening set 40 contacts the position ball 43, the cutter set 30 can be further moved toward the second end 202 of the collet 20 till the positioning protrusion 333 is aligned with the limiting groove 244, and the position ball 43 is slightly pushed into the spring room 42 to compress the spring 44 by the cutter body 31. After the cutter set 30 is rotated to turn the positioning protrusion 333 to engage with the limiting groove 244, the position ball 43 is pushed toward the first end 201 of the collet 20 by the spring 44 and pushes the cutter body 31 toward the first end 201 of the collet 20 to keep the positioning protrusion 333 tightly abutting against the surface of the limiting groove 244 adjacent to the first end 201 of the collet 20. Accordingly, the cutter set 30 is tightly engaged with the collet 20, a longitudinal assembling gap between the cutter set 30 and the collet 20 is reduced, and the cutter set 30 is stably and securely mounted in the collet 20.

What is claimed is:

1. A cutter holder assembly comprising:
   a cutter holder;
   a collet disposed in the cutter holder and the collet including:
      a first end;
      a second end;
      a chamber formed in the collet and extending from the first end toward the second end of the collet;
      a mounting cavity formed in the second end of the collet and communicating with the chamber; and
      a positioning groove recessed in an internal peripheral surface of the chamber and the positioning groove having:
         a guiding channel extending from the first end toward the second end of the collet; and
         a limiting groove circumferentially extending along the internal peripheral surface of the chamber, communicating with the guiding channel, and spaced apart from the first end and the second end of the collet;
   a cutter set mounted in the collet and the cutter set including:
      a cutter body inserted into the chamber of the collet; and
      a positioning protrusion protruding from an external peripheral surface of the cutter body, extending into the positioning groove, and engaged with the limiting groove; and
   a resilience tightening set mounted in the mounting cavity of the collet and the resilience tightening set including:
      a mounting base connected to the mounting cavity via a threaded engagement;
      a spring room having an opening facing toward the cutter set, wherein the spring room is formed in the mounting base;
      a spring disposed in the spring room;
      a position ball movably disposed in the spring room, partially protruding out of the opening of the spring room, and pushed by the spring for pushing the cutter body toward the first end of the collet to keep the positioning protrusion tightly abutting against a surface of the limiting groove of the positioning groove adjacent to the first end of the collet; and
      a snap ring, which with respect to a longitudinal center axis of the mounting base, is located between the spring and the opening of the spring room, the snap ring interfacing with the position ball and having an inner diameter that is smaller than a ball diameter of the position ball.

2. The cutter holder assembly as claimed in claim 1, wherein
   a diameter of the opening of the spring room of the resilience tightening set is smaller than the ball diameter of the position ball.

3. The cutter holder assembly as claimed in claim 2, wherein
   the cutter body has a key seat recessed in the external peripheral surface of the cutter body;
   the cutter set includes a position key detachably disposed on the key seat of the cutter body; and
   the positioning protrusion is formed at a side of the position key away from the cutter body.

4. The cutter holder assembly as claimed in claim 3, wherein the position key is magnetically attached to the cutter body.

5. The cutter holder assembly as claimed in claim 1, wherein
   the cutter body has a key seat recessed in the external peripheral surface of the cutter body;
   the cutter set includes a position key detachably disposed on the key seat of the cutter body; and
   the positioning protrusion is formed at a side of the position key away from the cutter body.

6. The cutter holder assembly as claimed in claim 5, wherein the position key is magnetically attached to the cutter body.

\* \* \* \* \*